Patented May 4, 1948

2,441,082

UNITED STATES PATENT OFFICE 2,441,082

THERMOSETTING FORMALDEHYDE-TREATED MONOOLEFIN/CARBON MONOXIDE POLYMERS

Paul Swithin Pinkney, Wilmington, Del., assignor to E. I. du Pont de Nemours & Company, Wilmington, Del., a corporation of Delaware No Drawing. Application June 13, 1945, Serial No. 599,318

8 Claims. (Cl. 260—67)

This invention relates to polymeric materials, and more particularly to new and improved thermosetting compositions and thermoset products.

This invention has as an object new and useful compositions of matter. Further objects are thermosetting compositions and thermoset products which are derived from polymeric materials and which are of particular utility for moldings, adhesive, coatings, etc. Further objects reside in methods for obtaining these compositions. Other objects will appear hereinafter.

These objects are accomplished through the preparation of the present thermosetting compositions by a method which comprises blending with a formaldehyde substance a monoolefin/carbon monoxide polymer which has been treated with a basic alkali metal or alkaline earth metal compound to increase its unsaturation and are further accomplished through the production of thermoset compositions or products by heating the above described blend.

The preparation of the monoolefin/carbon monoxide polymer and of the alkali treated polymer of increased unsaturation, which forms one component of the present compositions, is described more particularly below and comprises the following essential procedure. The initial monoolefin/carbon monoxide polymer is prepared by heating together carbon monoxide and ethylene under pressure in the presence of an organic peroxide catalyst. The alkali treated polymers are obtained by contacting an ethylene/carbon monoxide polymer with a basic compound, preferably an alkali metal hydroxide, until the degree of unsaturation of the polymer has been increased by an amount corresponding to an oxo oxygen loss of at least 5%. An iodine number of 25 corresponds approximately to an oxo oxygen loss of 5, and iodine number can therefore also be used to express degree of unsaturation.

The following examples are further illustrative of the practice of this invention. Unless otherwise stated parts are by weight.

Example I

An ethylene/carbon monoxide polymer is made as follows: A silver-lined pressure reactor is flushed with nitrogen, charged with 100 parts of dioxane and 0.5 part of diethyl dioxide, closed, evacuated, and pressured to 250 atm. with a mixture of carbon monoxide and ethylene containing 30% carbon monoxide. The reaction mixture is heated to 130° C. and kept at 128° to 132° C. for 10 hours, while the pressure is held at 600–700 atm. by occasional repressuring with the ethylene-carbon monoxide mixture. The product is worked on a hot rubber mill to remove the dioxane. The yield of polymer is 95 parts. Analysis show it to contain 42% carbon monoxide by weight. It has an intrinsic viscosity of 0.4 determined at 25° C. in chloroform at a concentration of 0.1 g./100 ml. of solution.

Thirty parts of the ethylene/carbon monoxide polymer, prepared as described above are dissolved in 150 parts of dioxane, 125 parts of methanol, and 5 parts of water. The solution is heated to boiling and to it is added a solution of 2 parts of potassium hydroxide in 40 parts of methanol. The reaction mixture is boiled for 1 hour, poured into water, and acidified with hydrochloric acid. The precipitate of alkali-treated ethylene/carbon monoxide polymer is filtered, washed with water and dried at room temperature. The yield of modified polymer is 22 parts. This product is friable, yellow, and soluble in chloroform and dioxane. It has an iodine number of 154 and contains 74.75% carbon and 7.63% hydrogen, while the untreated ethylene/carbon monoxide polymer has an iodine number of 5 and contains 67.62% carbon and 8.49% hydrogen.

The resulting alkali-treated ethylene/carbon monoxide polymer is intimately mixed mechanically with 20% of its weight of paraformaldehyde and placed on a metal melting point block heated to 170° C. It softens and then sets within one minute to a product which is no longer thermoplastic, i. e., it will no longer fuse under the pressure of a spatula at 170° C. The alkali-treated polymer alone, on the other hand, softens at 120° to 130 C. and remains thermoplastic for several minutes at 170° C.

Example II

A molding composition is prepared by milling together in a ball mill, 38 parts of the alkali-treated ethylene/carbon monoxide polymer prepared as described in Example I, 50 parts of 70 to 80 mesh white pine wood flour, 10 parts of paraformaldehyde, and 1.5 parts of aluminum stearate. The composition is compression molded into standard test bars at 160° C. under a pressure of 2000 lb./sq. in. for five minutes. The moldings are hard and rigid and have an impact strength of 0.36 ft. lb./in. of notch (Charpy), a tensile strength of 5800 lb./sq. in and a flexural strength of 10,000 lb./sq. in. Their yield temperature is 107° C. Moldings prepared under similar conditions from the above composition containing in addition 1 part of maleic acid have a yield temperature of 160° C.

Yield temperature measurements are carried out on 2½" x ½" x 1/16" molded bars. The bar is mounted horizontally by one end on a clamp, cantilever fashion, the supported end fitting ¼" into the vertical slot in the clamp so that the bar is supported ¼" from the end. At a point ¼" from the opposite end on the upper edge of the bar, a weight of 27.5 g. is placed so that it rests entirely on the test bar and is free to move up or down with the bar. The assembly (excepting the weight) is immersed in a bath of circulating mineral oil which is uniformly heated at a steady rate of 2° C./min. The yield temperature is observed as that bath temperature at which the test bar sags enough to permit the 27.5-g. weight to drop 0.06". It is to be understood that all yield temperatures of molded specimens subsequently mentioned herein are determined by this method.

*Example III*

A molding composition is prepared by milling together in a ball mill 26 parts of the alkali-treated ethylene/carbon monoxide polymer prepared as described in Example I, 60 parts of wood flour, 7 parts of paraformaldehyde, 0.7 part of maleic acid, 2 parts of aluminum stearate, and 3.5 parts of melamine. Moldings prepared from it at 160° C. under a pressure of 1500 lb./sq. in. for 2 minutes have a yield temperature of 155° C., while moldings prepared under the same conditions from a similar composition containing no melamine have a yield temperature of only 120° C.

*Example IV*

A molding composition is prepared by milling together in a ball mill 40 parts of the alkali-treated ethylene/carbon monoxide polymer prepared as described in Example I, 40 parts of wood flour, 10 parts of paraformaldehyde, 1 part of maleic acid, 2 parts of aluminum stearate, 5 parts of melamine, and 2 parts of hexamethylene-tetramine. Moldings prepared from this composition at 150° C. under a pressure of 500 lb./sq. in. for 5 minutes have a yield temperature of 165° C. The molding composition shows much better flow in the mold under these conditions than does a similar molding composition containing no hexamethylenetetramine.

*Example V*

A molding composition is prepared by milling together in a ball mill 21 parts of the alkali-treated ethylene/carbon monoxide polymer prepared as described in Example I, 27 parts of water-ground mica, 5.5 parts of paraformaldehyde, 1 part of maleic acid, and 0.8 part of aluminum stearate. Bars molded from this composition at 160° C. under a pressure of 2000 lb./sq. in. for 5 minutes have a yield temperature of 148° C. and are hard and very rigid. They have a flexural strength of 6070 lb./sq. in., a tensile strength of 3000 lb./sq. in., and an impact strength of 0.34 ft. lb./in. of notch (Charpy).

*Example VI*

Two hundred twenty six parts of an ethylene/carbon monoxide polymer prepared as described in Example I is dissolved in 1,130 parts of dry dioxane and 120 parts of methanol. To the solution at 80° C. is added 7.4 parts of potassium hydroxide as a 0.7 N solution in methanol. The reaction mixture is kept at 75° to 80° C. for 1½ hours, then poured into 2700 parts of water, and acidified with hydrochloric acid. The precipitate of alkali-treated ethylene/carbon monoxide polymer is separated by filtration, washed with water, and dried at 50° C. The yield of modified polymer is 180 parts. It contains 73.67% carbon and 7.78% hydrogen, while the untreated ethylene/carbon monoxide polymer contains 65.63% carbon and 8.45% hydrogen.

To a solution of 38 parts of the alkali-treated ethylene/carbon monoxide polymer prepared as described above, in 150 parts of dioxane at 70° C. are added 65 parts of aqueous 37% formaldehyde solution and 10 parts of aqueous 10% potassium carbonate solution. The reaction mixture is heated at 85° to 90° C. for one hour and then poured into 500 parts of water and acidified with hydrochloric acid. The solid product is separated by filtration, washed, and dried at room temperature. The yield of the methylol derivative of the alkali-treated ethylene/carbon monoxide polymer is 48 parts. It contains 65.01% carbon and 7.48% hydrogen, which corresponds to one methylol group for each oxygen atom in the alkali-treated ethylene/carbon monoxide polymer.

A molding composition is prepared by milling together in a ball mill 23.5 parts of the methylol polymer prepared as described above, 25 parts of 70 to 80-mesh white pine wood flour, 0.5 part of maleic acid, and 1 part of zinc stearate. The composition is compression molded into standard test bars at 160° C. under a pressure of 3,000 lb./sq. in. for 5 minutes. The moldings are hard and rigid and have a flexural strength of 9,000 lbs./sq. in. Their yield temperature is greater than 165° C.

*Example VII*

Thirty parts of an ethylene/carbon monoxide polymer prepared as described in Example I is dissolved in 150 parts of dry dioxane and 16 parts of methanol at 80° C. To the solution is added 0.8 part of potassium hydroxide as a 0.7 N solution in methanol. The reaction mixture is kept at 70° to 75° C for 1½ hours. Then 24 parts of aqeuous 37% formaldehyde solution is added. After 2 minutes the reaction mixture is dispersed in 500 cc. of water and acidified with hydrochloric acid. The solid product is separated by filtration, washed with water, and dried at room temperature. The yield of the methylol derivative of the alkali-treated ethylene/carbon monoxide polymer is 29 parts.

A molding composition is prepared by milling together in a ball mill 23.5 parts of the methylol polymer prepared as described above, 25 parts of 70 to 80-mesh white pine wood flour, 0.5 part of maleic acid, and 1 part of zinc stearate. The composition is compression molded into standard test bars at 160° C. under a pressure of 300 lbs./sq. in. for 5 minutes. The moldings are hard and rigid and have a flexural strength of 7,600 lbs./sq. in. Their yield temperature is greater than 165° C.

*Example VIII*

To a solution of 21 parts of the alkali-treated ethylene/carbon monoxide polymer prepared as described in Example I and one part of maleic acid in 120 parts of chloroform is added 5.5 parts of paraformaldehyde wet with chloroform. The mixture is shaken vigorously to disperse the paraformaldehyde and then is used for impregnating pieces of high tenacity viscose rayon laminating cloth. The dry impregnated fabric contains 40% of the resin-formaldehyde mixture. Eight layers of the impregnated fabric are pressed together at 160° C. under a pressure of 2500 lb./sq. in. for 5 minutes to form a rigid fabric lamination which has an impact strength of 0.47 ft. lb./in. of notch (Charpy), a flexural strength of 12,200 lb./sq. in. and a tensile strength of 8100 lb./sq. in.

*Example IX*

To 100 parts of the modified ethylene/carbon monoxide polymer prepared as in Example I is added 20 parts of paraformaldehyde and 10 parts of maleic acid. The mixture is dissolved in enough, 1,2-dichloroethane to yield a solution containing 25% total solids.

The above solution is brushed onto the surfaces of 1/16" birch veneers in amount of about 20 lb. of total solids per 1000 sq. ft. of glue line. The coating is allowed to dry at ordinary room temperature. Three of the veneer plies are then assembled with the center ply in cross-grain relationship with the outer plies and the assembly is pressed for 20 min. at 140° C. at a pressure of 200 lb./sq. in.

The resulting plywood tested in accordance with the procedure described in Army-Navy Aeronautical Specifications AN-NN-P-511b has a dry shear strength of 430 lb./sq. in. After three hours in boiling water it has a wet shear strength of 350 lb./sq. in., and after 48 hours soaking in water at ordinary temperatures it has a wet shear strength of 477 lb./sq. in.

*Example X*

To 100 parts of the modified ethylene/carbon monoxide/diethyl maleate polymer prepared as described below is added 20 parts of paraformaldehyde and the blend is dissolved in enough 1,2-dichloroethane to yield a solution containing 25% total solids.

The solution is brushed onto the surfaces of 1/16" birch veneers in an amount of about 20 lb. of total solids per 1000 sq. ft. of glue line. The coating is allowed to dry at ordinary temperatures. Three of the veneer plies are then assembled with the center ply in cross-grain relationship with the outer plies and the assembly is pressed for 20 mins. at 140° C. at a pressure of 200 lb./sq. in. The resulting plywood tested as described in Example VII is found to have a dry shear strength of 670 lb./sq. in. After three hours in boiling water it has a wet shear strength of 420 lb./sq. in., and after 48 hours in water at ordinary temperatures it has a wet shear strength of 413 lb./sq. in.

The modified ethylene/carbon monoxide/diethyl maleate polymer used in the above example is made as follows:

To a boiling solution of 50 parts of the ethylene/carbon monoxide/diethyl maleate polymer prepared as described hereinafter in 500 parts of dioxane containing 25 parts of water is added a solution of 10.3 parts of potassium hydroxide in 200 parts of methanol. Boiling is continued for eight minutes. The clear, dark reaction mixture is poured into 6000 parts of water. The resulting clear solution is strongly acidified with hydrochloric acid. The precipitated product is collected on a filter, washed with water, and dried at room temperature. The yield of modified polymer is 43 parts. It is readily soluble in chloroform, dioxane, or an aqueous sodium hydroxide solution.

The ethylene/carbon monoxide/diethyl maleate polymer is made as follows:

A silver-lined pressure reactor is flushed with nitrogen and charged with 100 parts of dioxane, 10 parts of diethyl maleate, and 0.5 part of diethyl dioxide. The reactor is then closed, evacuated, and pressured to 250 atm. with a mixture of carbon monoxide and ethylene containing 30% carbon monoxide. The reaction mixture is heated to 130° C. and kept at 127° to 131° C. for eight hours, while the pressure is held at 600 to 700 atm. by occasional repressuring with the ethylene/carbon monoxide mixture. The solvent and unreacted diethyl maleate are removed from the resulting polymer by distillation with steam and the polymer is dried by working on a warm rubber mill. The yield of polymer is 75 parts. It contains 10% diethyl maleate and 41% carbon monoxide by weight. Its intrinsic viscosity is 0.42 determined at 25° C. in chloroform at a concentration of 0.1 g./100 ml. of solution.

*Example XI*

An adhesive composition is compounded from the following ingredients in the proportions indicated:

| | Parts |
|---|---|
| Modified ethylene/carbon monoxide polymer of Example I | 27.5 |
| Polyvinyl alcohol | 2.8 |
| Water | 41.2 |

The above mixture is ground in a ball mill for 40 hours. To 30 parts of the dispersion thus obtained are added 1.3 parts of maleic acid and 2.5 parts of paraformaldehyde and the mixture is homogenized by stirring. The resulting dispersion is brushed onto the surfaces of 1/16" birch veneers in amount sufficient to provide 30 lbs. of total solids per 1000 sq. ft. of glue line. The coating is allowed to dry at room temperature. Three of the veneer plies are then assembled with the center ply in cross-grain relationship with the outer plies and the assembly is pressed for 20 minutes at 140° C. under 200 lb./sq. in. pressure. The plywood thus obtained has a dry shear strength of 430 lb./sq. in. and a wet shear strength after the three hour boil test of 290 lb. sq. in. After 48 hours in water at room temperature it has a wet shear strength of 287 lb./sq. in.

The monoolefin/carbon monoxide polymers used in the preparation of the thermosetting compositions of this invention are those which have been treated with a basic alkali metal or alkaline earth metal compound until the degree of unsaturation of the polymer has been increased to a value corresponding to an oxo oxygen loss of at least 5%, preferably at least 15% but not more than 50%. The preparation of these modified polymers is described in more detail in applications Serial Numbers 575,560, filed January 31, 1945, by Paul S. Pinkney, and 575,559, filed January 31, 1941, by S. L. Scott.

The alkali or alkaline earth metal compounds used in the treatment of the monoolefin/carbon monoxide polymers are those which are basic. By "basic," as used herein, is meant that the material in its free state can react with acids to form salts. Examples of suitable basic materials are sodium, potassium, and lithium hydroxides, sodium, potassium, and lithium carbonates, sodium and potassium acetates, disodium and trisodium phosphates, sodium, potassium, and lithium alcoholates, etc. In general, substances which yield the aforesaid hydroxides on hydrolysis will be understood to be equivalent to the hydroxides. From the standpoints of economy and effectiveness, the alkali metal hydroxides, especially sodium and potassium hydroxides, are preferred for the treatment of the monoolefin/carbon monoxide polymers.

Monoolefin/carbon monoxide polymers suitable for treatment with alkali to obtain products useful for forming thermosetting resins are preferably those which are soluble in hot dioxane and dioxolane and which contain from 20 to 50 mole percent of carbon monoxide. The remaining 80 to 50 mole percent can consist either of monoolefin alone or of monoolefin plus a minor amount of a third polymerizable component. Those containing from 40 to 50 mole percent of carbon monoxide are preferable since they provide more rigid moldings than polymers containing less than 40 mole percent of carbon monoxide. Monoolefins polymerized with carbon monoxide to give polymers suitable for use in this invention include ethylene, propylene, the butylenes, and mixtures thereof. Of these ethylene is preferred because of the superior rigidity of thermoset products prepared from alkali-treated ethylene/carbon monoxide polymers. The polymers may also contain minor proportions, for example up to 20% or more, of one or more additional components such as vinyl acetate or diethyl maleate. The preparation of these polymers is described in the copending applications of M. M. Brubaker, S. N. 449,765, filed July 4, 1942, now abandoned, and S. N. 552,374, filed September 1, 1944.

The alkali treatment of ethylene/carbon monoxide polymers may be carried out by any convenient method such as, for example, by mixing solutions of the basic compound and polymer in suitable solvents, by adding the basic material to a dispersion of the polymer, etc. Generally the alkali treatment is carried out in 1,3-dioxolane, or in dioxane containing enough water or methanol to prevent formation of products which are insoluble in the reaction medium. When the alkali treatment is carried out to such an extent that the products obtained are insoluble in the reaction medium, it is usually necessary to employ higher molding pressures to obtain satisfactory flow of molding compositions based on such products. Therefore, the proportion of solvent, alkali, and polymer and the duration and temperature of the treatment are preferably adjusted to obtain products which remain soluble in the reaction mixture during the treatment. Such products, after acidification, are usually soluble also in chloroform to form solutions of lower viscosity than solutions of the original, untreated polymers.

By "formaldehyde substance" as used herein, is meant formaldehyde and the formaldehyde-yielding materials mentioned below. The proportion of the formaldehyde substance employed is sufficient to provide the equivalent of from 0.5% to 50%, based on the alkali treated polymer, of free formaldehyde. The rate and extent of thermosetting are more satisfactory when from 10% to 35% of the formaldehyde substance, based on the polymer, is used. Examples of formaldehyde-yielding materials other than formaldehyde are trioxymethylene, hexamethylenetetramine, paraformaldehyde, 1,3,5-trioxane, etc.

In the formulation of the thermosetting compositions of this invention, the modified monoolefin/carbon monoxide polymer, formaldehyde substance, and any other ingredients of the composition, may be blended by any convenient method. Thus, the modified monoolefin/carbon monoxide polymer and formaldehyde substance may be combined chemically to form an intermediate stage resin which can subsequently be compounded with any other components of the composition, and the resulting blend can subsequently be cured by heat-treatment. Alternatively the modified monoolefin/carbon monoxide polymer can be mechanically mixed with the formaldehyde substance and any other components of the composition to form a thermosetting blend. This blending can be accomplished in a ball mill, rubber mill, Banbury mixer, ribbon blender, or in any other suitable mixing device. The blending can also be accomplished through the use of a common solvent for the modified monoolefin/carbon monoxide polymer and formaldehyde substance, or in a solvent for one of the components only, or in a nonsolvent liquid medium.

Although the use of acid catalysts for the thermosetting reaction is not essential, the rate of cure, water-resistance, etc., of the thermoset products are improved through the use of such catalysts, and their employment constitutes a preferred embodiment of this invention. Usually the amount of catalyst employed varies from 0.25 to 15% by weight of the modified monoolefin/carbon monoxide polymer. The preferred catalysts are dibasic carboxylic acids such as maleic, phthalic and citric acids. Acid reacting materials like ammonium chloride and urea nitrate are also effective catalysts.

The temperature at which the conversion of the thermosetting composition of this invention to a cured, non-thermoplastic product is effected is variable and depends upon such factors as the nature and proportion of the polymer, filler, catalyst, curing assistants, e. g., melamine or dicyandiamide, etc. It also depends upon the time employed. Although curing under some conditions can be effected at room temperature, it is generally preferred to employ temperatures of from 70° C. to the decomposition temperature of the ingredients of the composition. As a rule, however, the temperatures employed will range from about 130° to about 200° C.

In preparing moldings the pressure employed is that required to give fusion and flow under the conditions used. Generally pressures in excess of 100 lb./sq. in. are employed.

For best results it is desirable that the molding compound be dried before it is molded. To the molding compound may be added mold lubricants, such as zinc or aluminum stearates, etc.

To the thermosetting compositions of this invention may be added organic or mineral, inert or reinforcing fillers, e. g., wood flour, mica, silica, asbestos, macerated fabrics, hemp fibers, clay, carborundum, etc., in amounts which may be up to 90% or more of the final composition. The compositions may also contain dyes, toners, pigments, e. g., titanium dioxide, carbon black, etc., or other coloring agents. If desired, small amounts of other thermosetting resins, such as urea-formaldehyde or phenol-formaldehyde resins, can be added to the compositions.

Although the examples have illustrated use of the compositions of this invention in the preparation of shaped articles by compression molding, it is to be understood that they can also be employed in making shaped articles by jet or transfer molding techniques.

The compositions described herein, in addition to being valuable thermosetting bonding agents for plywood, are also useful as adhesives in other applications and as protective and/or decorative coatings for metal, wood, etc. They are also useful in finishing fabrics, as wire coatings, especially for electrical insulation, as impregnants for hardening woods, etc., as bonding agents for abrasives, etc.

As many apparently widely different embodiments of this invention may be made without departing from the spirit and scope thereof, it is to be understood that I do not limit myself to the specific embodiments thereof except as defined in the appended claims.

I claim:

1. A process for obtaining thermosetting compositions, said process comprising reacting a monoolefin/carbon monoxide polymer in which the monoolefin has from 2 to 4 carbon atoms with reacting material consisting of a basic substance selected from the group consisting of alkali metal compounds and alkaline earth metal compounds, continuing the reaction until the degree of unsaturation of said polymer has been increased to a value corresponding to an oxo oxygen loss of at least 5% but not more than 50%, and then reacting the polymer with a formaldehyde substance selected from the group consisting of hexamethylenetetramine, paraformaldehyde, 1,3,5-trioxane, and formaldehyde, said polymer consisting of from 20 to 50 mol per cent carbon monoxide and from 80 to 50 mol per cent of polymerizable material consisting predominately of said monoolefin.

2. A process for obtaining thermoset compositions, said process comprising reacting a monoolefin/carbon monoxide polymer in which the monoolefin has from 2 to 4 carbon atoms with reacting material consisting of a basic substance selected from the group consisting of alkali metal compounds and alkaline earth metal compounds, continuing the reaction until the degree of unsaturation of said polymer has been increased to a value corresponding to an oxo oxygen loss of at least 5% but not more than 50%, then reacting the polymer with a formaldehyde substance selected from the group consisting of hexamethylenetetramine, paraformaldehyde, 1,3,5-trioxane, and formaldehyde, and then heating the composition until it is thermoset, said polymer consisting of from 20 to 50 mol per cent carbon monoxide and from 80 to 50 mol per cent of polymerizable material consisting predominately of said monoolefin.

3. The thermosetting composition obtained by the process set forth in claim 1.

4. The thermoset composition obtained by the process set forth in claim 2.

5. The process set forth in claim 1 in which said monoolefin is ethylene and in which said formaldehyde substance is paraformaldehyde.

6. The thermosetting composition obtained by the process set forth in claim 5.

7. The process set forth in claim 2 in which said monoolefin is ethylene and in which said formaldehyde substance is paraformaldehyde.

8. The thermoset composition obtained by the process set forth in claim 7.

PAUL SWITHIN PINKNEY.

REFERENCES CITED

The following references are of record in the file of this patent:

UNITED STATES PATENTS

| Number | Name | Date |
|---|---|---|
| 2,351,120 | Hanford | June 13, 1944 |

---

Certificate of Correction

Patent No. 2,441,082. May 4, 1948.

PAUL SWITHIN PINKNEY

It is hereby certified that error appears in the printed specification of the above numbered patent requiring correction as follows: Column 4, lines 61 and 62, for "300 lbs./sq. in." read *3000 lbs./sq. in.*; and that the said Letters Patent should be read with this correction therein that the same may conform to the record of the case in the Patent Office.

Signed and sealed this 29th day of June, A. D. 1948.

[SEAL]

THOMAS F. MURPHY,
*Assistant Commissioner of Patents.*

The compositions described herein, in addition to being valuable thermosetting bonding agents for plywood, are also useful as adhesives in other applications and as protective and/or decorative coatings for metal, wood, etc. They are also useful in finishing fabrics, as wire coatings, especially for electrical insulation, as impregnants for hardening woods, etc., as bonding agents for abrasives, etc.

As many apparently widely different embodiments of this invention may be made without departing from the spirit and scope thereof, it is to be understood that I do not limit myself to the specific embodiments thereof except as defined in the appended claims.

I claim:

1. A process for obtaining thermosetting compositions, said process comprising reacting a monoolefin/carbon monoxide polymer in which the monoolefin has from 2 to 4 carbon atoms with reacting material consisting of a basic substance selected from the group consisting of alkali metal compounds and alkaline earth metal compounds, continuing the reaction until the degree of unsaturation of said polymer has been increased to a value corresponding to an oxo oxygen loss of at least 5% but not more than 50%, and then reacting the polymer with a formaldehyde substance selected from the group consisting of hexamethylenetetramine, paraformaldehyde, 1,3,5-trioxane, and formaldehyde, said polymer consisting of from 20 to 50 mol per cent carbon monoxide and from 80 to 50 mol per cent of polymerizable material consisting predominately of said monoolefin.

2. A process for obtaining thermoset compositions, said process comprising reacting a monoolefin/carbon monoxide polymer in which the monoolefin has from 2 to 4 carbon atoms with reacting material consisting of a basic substance selected from the group consisting of alkali metal compounds and alkaline earth metal compounds, continuing the reaction until the degree of unsaturation of said polymer has been increased to a value corresponding to an oxo oxygen loss of at least 5% but not more than 50%, then reacting the polymer with a formaldehyde substance selected from the group consisting of hexamethylenetetramine, paraformaldehyde, 1,3,5-trioxane, and formaldehyde, and then heating the composition until it is thermoset, said polymer consisting of from 20 to 50 mol per cent carbon monoxide and from 80 to 50 mol per cent of polymerizable material consisting predominately of said monoolefin.

3. The thermosetting composition obtained by the process set forth in claim 1.

4. The thermoset composition obtained by the process set forth in claim 2.

5. The process set forth in claim 1 in which said monoolefin is ethylene and in which said formaldehyde substance is paraformaldehyde.

6. The thermosetting composition obtained by the process set forth in claim 5.

7. The process set forth in claim 2 in which said monoolefin is ethylene and in which said formaldehyde substance is paraformaldehyde.

8. The thermoset composition obtained by the process set forth in claim 7.

PAUL SWITHIN PINKNEY.

REFERENCES CITED

The following references are of record in the file of this patent:

UNITED STATES PATENTS

| Number | Name | Date |
|---|---|---|
| 2,351,120 | Hanford | June 13, 1944 |

---

Certificate of Correction

Patent No. 2,441,082.      May 4, 1948.

PAUL SWITHIN PINKNEY

It is hereby certified that error appears in the printed specification of the above numbered patent requiring correction as follows: Column 4, lines 61 and 62, for "300 lbs./sq. in." read *3000 lbs./sq. in.*; and that the said Letters Patent should be read with this correction therein that the same may conform to the record of the case in the Patent Office.

Signed and sealed this 29th day of June, A. D. 1948.

[SEAL]

THOMAS F. MURPHY,
*Assistant Commissioner of Patents.*